United States Patent Office 2,946,694
Patented July 26, 1960

2,946,694

GLASS COMPOSITION

Dominick Labino, Maumee, Ohio, assignor to L.O.F. Glass Fibers Company, Toledo, Ohio, a corporation of Ohio No Drawing. Filed June 2, 1958, Ser. No. 738,987

5 Claims. (Cl. 106—47)

This invention relates to glass compositions which readily melt at a low temperature and has particular reference to glass compositions which are of utility in the formation of glass fibers.

This application is a continuation-in-part of my copending application Serial No. 554,634, filed December 22, 1955, and now abandoned.

A primary object of the invention is to provide glass compositions which readily melt at low temperatures and which are readily fabricated into useful items on a commercial scale.

A further object of the invention is to provide a silica-free glass which exhibits in the molten state characteristics which render it useful in the formation of fine fibers.

The present invention, therefore, is concerned with the attaining of a glass which has a reasonably low viscosity in the working range; a temperature range in which the viscosity does not change unduly throughout the range and in which range the glass is workable for production of the fibers; a high melting rate; a low liquidus temperature with relation to the temperature at which the glass is usually worked; a suitable fiber-forming viscosity or fluidity at low temperature which permits high production rates; a low devitrification rate which inhibits devitrification when the glass is quickly cooled as at the orifices of the fiber-forming apparatus.

The glass-forming oxides in the glasses of invention are $P_2O_5$, $B_2O_3$ and $Al_2O_3$ in combination and usually are present to the extent of less than about 60% by weight.

Batch compositions within the scope of the invention and the percent calculated oxide composition of the glasses formed therefrom are listed in Table I below:

of this type, it is common to show the oxygen equivalent of the fluorine as being subtracted from the total oxide percentage. To obtain the oxygen equivalent of the fluorine the percent fluorine shown should be multiplied by a factor of 0.41.

The lithium carbonate serves to increase the fluidity of the glass; the constituent may suitably be varied from between about 0 to 9 percent of the total batch.

The aluminum hydroxide is particularly important with respect to the control of devitrification, the liquidus temperature and the durability of the product; manganic or other similar trivalent oxides perform a similar function and may replace the aluminum hydroxide in part. The hydroxide is present in a relatively large proportion but does not act to make the glass noticeably hard as is frequently the case with silica-base glasses—apparently the hydroxide exerts a beneficial fluxing action for the percent usable may be increased in the above formula to about 30 at the expense of the phosphate without resulting in harmful effects in the product. A percentage of at least about 15 is required for adequate action.

The boric acid has beneficial effects on the liquidus temperature and may be employed to the extent of 14 to 20%; at the high percents care must be exercised in the preparation of the mix as the boric oxide gives rise to some difficulties due to its volatility. An increase of the boric oxide above the indicated proportion lessens the resistance of the glass to attack by acids and water.

The cryolite which is sodium aluminum fluoride ($Na_3AlF_6$) is preferably added in a weight percent between about 12 and 17 and is effective to provide both fluorine and alkali to the batch; the fluorine functions to decrease the viscosity of the glass at a given temperature without deleteriously affecting the durability; the melting rate is also assisted by the presence of the fluorine which is added preferably in the form of the fluoride to minimize danger from fumes; other fluorides may be similarly employed.

The sodium phosphate is suitably employed in a weight percent between about 30 and 55 and is principally effective in providing for resistance to acid attack; decreasing the phosphate increases the susceptibility of the glass to attack by strong acids.

The alkali which is derived from both the cryolite and the phosphate is high in the present glasses and reduces the founding temperature and glass viscosity.

Representative melts were made from batches of the composition listed in Table I under No. 1. Thirty five grams of mixed batch were melted in a platinum pot in each test. The results are listed in Table II below:

Table I

| Batch Weights | No. 1 | No. 2 | No. 3 | No. 4 | No. 5 |
|---|---|---|---|---|---|
| Lithium Carbonate | 6.76 | 2.00 | 3.90 | 8.00 | 2.00 |
| Aluminum Hydrate | 20.70 | 16.00 | 27.86 | 20.70 | 16.00 |
| Boric Acid | 16.60 | 20.00 | 19.60 | 16.60 | 16.60 |
| Cryolite | 15.40 | 15.40 | 12.00 | 12.00 | 15.40 |
| Sodium Phosphate ($Na_3PO_4$) | 40.54 | 46.60 | 36.64 | 42.70 | 50.00 |
| Percent Calculated Oxide Composition: | | | | | |
| $Al_2O_3$ | 21.3 | 17.0 | 28.8 | 20.5 | 16.7 |
| $Na_2O$ | 36.6 | 39.4 | 33.0 | 36.6 | 41.0 |
| $Li_2O$ | 3.4 | 1.0 | 2.0 | 4.0 | 1.0 |
| $B_2O_3$ | 11.5 | 13.4 | 13.9 | 11.6 | 10.9 |
| $P_2O_5$ | 21.1 | 23.5 | 19.5 | 22.4 | 24.7 |
| $F_2$ | 10.4 | 10.0 | 8.3 | 8.1 | 9.7 |
| | 104.3 | 104.3 | 103.5 | 103.2 | 104.0 |

Table II

| Pot Temp. (F.) | Time, Batch Free, minutes | Time, Seed Free, minutes | Remarks |
|---|---|---|---|
| 1,200° | 16 | over 30 | Melted very slowly, did not become seed-free. Dark gray color glass. |
| 1,350° | 10 | 16 | Melted slowly, much more fluid than at 1200°. Gray color glass. |
| 1,500° | 4½ | 7 | Melted fast and bubbled rapidly during melting. Glass nearly clear, with a yellow-gray color. |
| 1,700° | 4 | 7 | Melted fast, bubbled after it was batch-free, and looked like reboil. Glass clear. |

The total oxide is over 100 as shown because the fluorine in the actual glass would replace some of the oxygen reported in the other oxides. In the analysis for a glass During cooling in the pot, the glass became rigid at about 700–750° F. Devitrification appeared rapid at 1100–1200° F. and lower, and glass became clear and fluid rapidly at about 1500 F.

From the above results approximately 1500° F. appears to be the best temperature at which to melt this batch composition.

The No. 3 glass, appearing in Table I, would be the hardest melting of the batches listed. This would be due to its relatively higher content of aluminum hydrate and to the presence of less of the fluxing materials such as lithium carbonate and cryolite in the batch. The No. 4 glass and the No. 1 glass would be easier melting. However, because all of the glasses melt easily at a low temperature, there would not be a great deal of difference in the melting characteristics of any one batch as contrasted with any other batch.

Glasses formed in accordance with this invention have proven to be of exceptional value in the production of low melting temperature glasses. These glasses have substantially the composition by weight listed in Table III below:

Table III

| | Percent |
|---|---|
| $Li_2O$ | 0–4.5 |
| $Al_2O_3$ | 16.0–28.0 |
| $B_2O_3$ | 10.5–14.0 |
| $Na_2O$ | 31–42 |
| $P_2O_5$ | 18–25 |
| $F_2$ | 8–10.5 |

It will be understood that this invention is susceptible to modifications in order to adapt it to different usages and conditions and accordingly, it is desired to comprehend such modifications within this invention as may fall within the scope of the appended claims.

I claim:

1. A glass composition consisting essentially of the heat reacted product of the following component ingredients by weight in substantially the proportions indicated:

| | Percent |
|---|---|
| Lithium carbonate ($Li_2CO_3$) | 0–9 |
| Aluminum hydroxide ($Al(OH)_3$) | 15–30 |
| Boric acid ($H_3BO_3$) | 14–20 |
| Cryolite ($Na_3AlF_6$) | 12–17 |
| Sodium phosphate ($Na_3PO_4$) | 30–55 |

2. A glass composition consisting essentially of the heat reacted product of the following component ingredients by weight in substantially the proportions indicated:

| | Weight percent |
|---|---|
| Lithium carbonate ($Li_2CO_3$) | 6.76 |
| Aluminum hydroxide ($Al(OH)_3$) | 20.7 |
| Boric acid ($H_3BO_3$) | 16.6 |
| Cryolite (sodium aluminum fluoride) ($Na_3AlF_6$) | 15.4 |
| Sodium phosphate ($Na_3PO_4$) | 40.54 |

3. A glass having substantially the following composition by weight:

| | Percent |
|---|---|
| $Li_2O$ | 0–4.5 |
| $Al_2O_3$ | 16.0–28.0 |
| $B_2O_3$ | 10.5–14.0 |
| $Na_2O$ | 31–42 |
| $P_2O_5$ | 18–25 |
| $F_2$ | 8–10.5 |

4. A glass having substantially the following composition by weight:

| | Percent |
|---|---|
| $Al_2O_3$ | 21.3 |
| $Na_2O$ | 36.6 |
| $Li_2O$ | 3.4 |
| $B_2O_3$ | 11.5 |
| $P_2O_5$ | 21.1 |
| $F_2$ | 10.4 |

5. A glass forming composition capable of formulation upon the application of heat consisting essentially of the following ingredients by weight:

| | Percent |
|---|---|
| Lithium carbonate ($Li_2CO_3$) | 0–9 |
| Aluminum hydroxide ($Al(OH)_3$) | 15–30 |
| Boric acid ($H_3BO_3$) | 14–20 |
| Cryolite ($Na_3AlF_6$) | 12–17 |
| Sodium phosphate ($Na_3PO_4$) | 30–55 |

References Cited in the file of this patent

UNITED STATES PATENTS

| 2,577,627 | Pincus | Dec. 4, 1951 |

FOREIGN PATENTS

| 498,049 | Great Britain | Jan. 3, 1939 |
| 941,885 | France | Jan. 24, 1949 |